United States Patent [19]

Hashizaki et al.

[11] 4,167,762
[45] Sep. 11, 1979

[54] OPEN LOOP SERVO-SYSTEM FOR ACCURATE TRACKING IN A VIDEO SIGNAL REPRODUCING APPARATUS

[75] Inventors: Kazuo Hashizaki, Tokyo; Kyoichi Shirane, Yokohama, both of Japan

[73] Assignee: Sony Corporation, Tokyo, Japan

[21] Appl. No.: 856,845

[22] Filed: Dec. 1, 1977

[30] Foreign Application Priority Data

Dec. 2, 1976 [JP] Japan ................................. 51-145113

[51] Int. Cl.² ........................ G11B 21/10; G11B 5/52
[52] U.S. Cl. ......................................... 360/77; 360/70
[58] Field of Search .................... 360/70, 77, 10, 107, 360/109, 75, 76

[56] References Cited

U.S. PATENT DOCUMENTS

| 3,293,359 | 12/1966 | Yasuoka et al. | 360/70 |
| 3,355,547 | 11/1967 | Aratani et al. | 360/70 |
| 3,358,080 | 12/1967 | Macleod | 360/70 |
| 3,905,043 | 9/1975 | Frank | 360/70 |
| 3,958,271 | 5/1976 | Sumiyoshi | 360/70 |

FOREIGN PATENT DOCUMENTS

| 2293118 | 6/1976 | France | 360/77 |
| 49-9919 | 1/1974 | Japan | 360/10 |
| 49-84617 | 8/1974 | Japan | 360/77 |

*Primary Examiner*—Bernard Konick
*Assistant Examiner*—Donald McElheny, Jr.
*Attorney, Agent, or Firm*—Lewis H. Eslinger; Alvin Sinderbrand

[57] ABSTRACT

In a VTR having a rotary transducer for scanning parallel tracks on a record medium in which signal information is recorded and being displaced at a skew angle with respect to the direction of travel of the record medium, an electromechanical adjustable transducer support, preferably of a piezo-ceramic material supports the transducer for displacement transversely with respect to the parallel tracks in response to a drive signal, and an open loop servo circuit is provided for generating the drive signal to align the scanning path of the transducer with one of the parallel tracks. The open loop servo system includes a first detecting device for detecting the position of the beginning of one of the parallel tracks, a second detecting device for detecting the rotational position of the rotary transducer, a device for generating an output speed signal corresponding to the speed of the record medium, and a signal processing device receiving the outputs of the first and second detecting devices and the speed signal generating device for generating a first component signal which corresponds to the deviation between the beginning of the transducer scanning path and a recorded track and is a function of the relative speed between the rotary transducer and the record medium. The open loop servo system further includes a sawtooth waveform generating device responsive to an output from the second detecting device, and an amplitude adjusting device supplied with the output of the sawtooth waveform generating device and being responsive to the output of the speed signal generating device for generating a second component signal, with the first and second component signals being added for producing the drive signal by which the transducer is transversely displaced with respect to a parallel record track.

7 Claims, 16 Drawing Figures

OPEN LOOP SERVO-SYSTEM FOR ACCURATE TRACKING IN A VIDEO SIGNAL REPRODUCING APPARATUS

BACKGROUND OF THE INVENTION

This invention generally relates to a tracking-error correcting apparatus for use in an apparatus of the type wherein signal information is recorded in parallel skewed tracks on a record medium and has particular application to a video tape recorder (VTR) in which stop-motion, slow-motion or fast-motion pictures as well as normal-motion pictures can be reproduced.

In a conventional VTR, a rotary transducer head assembly is provided with one or more magnetic transducers which scan successive parallel tracks on a magnetic record tape so as to record and/or reproduce video signals in such tracks. In general, while the one or more transducers rotate across the tape, the tape itself longitudinal direction thereof. A typical VTR includes one, and preferably two, record and/or playback transducers mounted on a suitable rotary assembly so as to rotatably scan a magnetic tape which is helically wrapped about at least a portion of a guide drum forming a part of the transducer assembly. During recording, a tracking servo system controls the rotation of the transducers with respect to the tape movement, and control pulse signals are recorded on a marginal portion of the tape. During reproduction, the same or a similar servo control system is used to synchronize the movement of the tape to the rotation of the transducers in accordance with the recorded control pulse signals. Consequently, an accurate video picture can be displayed in response to the reproduced video signal. This accuracy is, in large part, due to the fact that the servo control system tends to control the relative movement and position between the rotary transducers and the tape such that each transducer scans substantially the same track during reproduction operation as was scanned during the recording operation. Therefore, during normal tape speed (normal mode), the servo system serves to insure that the scanning path of the heads substantially coincides with the previously recorded tracks.

Recently, many VTR systems have been provided with various reproducing operations, such as "stop or still-motion", "slow-motion" and "quick or fast-motion". In these various reproducing modes, the tape speed differs from the speed during the recording mode. Consequently, the scanning path is different from the recorded track during these different reproducing modes, that is the scanning path is inclined, or angularly disposed, with respect to the recorded track. Thus, in various modes other than "normal operation", guard band noise and cross-talk with result due to tracking errors or scanning deviation. Generally, upon leaving the prerecorded track, the transducer starts scanning a guard band disposed in-between recorded tracks. Accordingly, the output signal of the transducer will be reduced and contain a noise component. On the other hand, as the transducer starts scanning the next recorded track, the transducer picks up signals from two adjacent tracks resulting in cross-talk. This tracking error due to the variation in the tape speed results in a deterioration of the reproduced pictures.

SUMMARY OF THE INVENTION

It is therefore an object of the present invention to provide a video recording and reproducing apparatus of the type employing a rotary transducer for reproducing signal information recorded in a plurality of parallel skewed tracks on a record medium, which apparatus automatically causes the rotary transducer to track the recorded tracks on said record medium regardless of the speed of the record medium.

It is another object of the invention to provide a video tape recorder having various modes such as stop-motion, slow-motion, and fast-motion as well as normal operation which produces a good quality picture in all modes of operation.

It is a further object of the instant invention to provide an improved video tape recorder of the type employing a rotary transducer head assembly wherein the transverse position of the transducer with respect to a recorded track is automatically varied as a function of tape speed.

According to an aspect of the invention, in an apparatus of the type in which signal information is recorded in a plurality of parallel tracks on a record medium, with the parallel tracks being disposed at a skew angle with respect to the direction of travel of the record medium, and in which a rotary transducer for scanning the parallel tracks is supported by an electro-mechanical adjustable transducer support operative to displace the transducer transversely with respect to the parallel tracks in response to a drive signal, an open loop servo system is provided for generating the drive signal to align the scanning path of the transducer with one of the parallel tracks. The open loop servo system comprises first detecting means for detecting the position of the beginning of one of the parallel tracks along the direction of the travel of the record medium and providing a first output, second detecting means for detecting the rotational position of the rotary transducer and providing a second output, means for generating an output signal corresponding to the speed of the record medium, and signal processing means receiving as inputs the outputs of the first and second detecting means and the speed signal generating means for generating the drive signal.

In a preferred embodiment, the open loop servo system further comprises sawtooth waveform generating means responsive to the second detecting means for producing a sawtooth waveform signal having a fixed period which is substantially equal to the time required for the rotary transducer to traverse its scanning path on the record medium, amplitude adjusting means connected to receive the output of the sawtooth waveform generating means and responsive to the output of the speed signal means for changing the slope of the sawtooth waveform signal as a function of the speed of the record medium, and adding means for adding the outputs of the signal processing means and the amplitude adjusting means for generating the drive signal.

The above, and other objects, features and advantages of the invention, will be apparent in the following detailed description of an illustrative embodiment of the invention which is to be read in connection with the accompanying drawings.

BRIEF DESCRIPTION OF THE DRAWINGS

The manner in which the foregoing objects and other advantages of the invention are attained will be better understood from the following detailed description of a preferred embodiment with reference to the accompanying drawings, in which.

DETAILED DESCRIPTION OF THE PREFERRED EMBODIMENT

The following detailed description, given by way of example, will best be understood in conjunction with the accompanying drawings. For the purpose of simplification and to facilitate an understanding of the present invention, the following description relates to the environment of a video signal recorder and, more particularly, to a VTR. However, the problems to which the present invention is addressed, and the solution to those problems, as disclosed herein, are not limited solely to video signal recording apparatus. Hence, it should be understood that this description also is applicable to other types of analog signal recording devices, to digital signal recording devices and to other rotary head scanning apparatus which can be used for recording, reproducing, or other purposes.

Figure 1A:
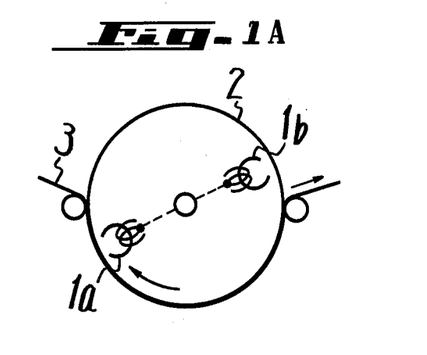
FIGS. 1A and 1B are top and side schematic views, respectively, illustrating a rotary transducer head assembly and the manner in which a tape record medium is helically wrapped around a guide drum.

Turning now to FIG. 1A, there is schematically illustrated a top view of a typical rotary head scanning device, such as used in a VTR. As is conventional, this device is formed with two magnetic record/playback transducers 1a, 1b which are adapted for rotation about a central axis. A guide drum 2 is adapted to receive a record medium, such as tape 3, wrapped helically thereabout for at least 180°. Transducers 1a and 1b may be mounted on diametrically opposed arms which are rotated so as to scan successive, parallel, skewed tracks across tape 3. Thus, transducers 1a and 1b rotate in the clockwise direction as indicated by the arrow while tape 3 is advanced to the right and counter-clockwise about the guide drum so as to record signal information thereon.

Figure 1B:
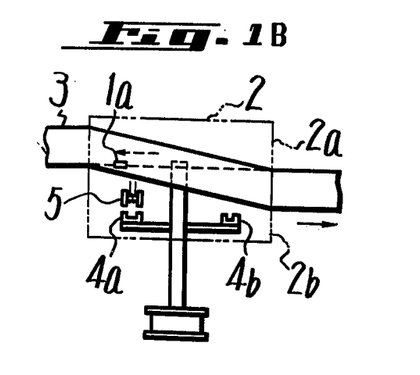

Alternatively, and as shown in FIG. 1B, guide drum 2 may be formed of two drums 2a, 2b disposed in face-to-face configuration and spaced so as to define a scanning gap therebetween. Tape 3 is helically wrapped about a portion of the surface of guide drum 2 so that the record tracks recorded by transducers 1a, 1b are skewed relative to the longitudinal direction of the tape. When two transducers are used, it will be appreciated that alternate tracks are recorded thereby, that is, first transducer 1a records one track, then transducer 1b records the next adjacent track, then transducer 1a records the following track, and so on. In the alternative structure of FIG. 1B, transducers 1a and 1b are mounted on one of drums 2a, 2b, this drum being rotated relative to the other drum such that the heads traverse the aforementioned scanning paths.

During a signal recording operation and during a "normal" signal reproducing operation, the relative speed of tape 3 with respect to transducers 1a and 1b is the same. Suitable servo control circuitry (not shown) generally is provided to account for relatively small changes in tape-drive and head-drive motor speeds, tape shrinkage, tape stretching, differences from one apparatus to another, and the like. To this effect, a head-position generator is provided to generate pulses when transducers 1a, 1b rotate into predetermined position, such as when transducer 1a first contacts tape 3, that is, when transducer 1a commences its scanning path. Typically, the head-position generator is formed of magnetic elements 4a, 4b which are secured to the shaft which rotates transducers 1a, 1b. Elements 4a, 4b rotate with transducers 1a, 1b and pass a fixedly disposed magnetic pick-up sensor 5 which generates a position detecting pulse as a function of the rotational position of elements 4a, 4b a typical video recording apparatus, each transducer records a complete field in a respective record track, and the transducers are rotated at a speed of 30 rps. Consequently, the position detecting pulses generated by pick-up sensor 5 have a frequency of 30×2 Hz or 60 Hz.

Desirably, the video signal recording/reproducing apparatus exhibits both a normal reproducing mode and a "non-normal" reproducing mode. In the former, the record medium is advanced at the same speed during the reproducing operation as during a recording operation. However, in the latter, although transducers 1a, 1b are rotated at the same rate as during the recording mode, the speed of the record medium is changed. Thus, in a non-normal reproducing mode, the relative speed of movement between the record medium and the transducers differs from that during the recording mode. Typical examples of such non-normal reproducing modes are the "stop-motion" mode wherein the record medium is stopped completely so that the same record track is scanned repetitively by the transducers; the "slow-motion" mode wherein the record medium is advanced at a fraction of its normal speed such that the transducers scan substantially the same track a multiple number of times; and the "quick or fast-motion" mode wherein the record medium is advanced at a much faster speed than during recording. A common problem in each of these non-normal reproducing modes is that the scanning path traversed by the transducers no longer coincides with the previously recorded record track. This, of course, is due to the change in the relative speed of movement of the record medium with respect to the scanning transducers during such non-normal reproducing mode as compared to the normal recording speed. Because of such deviation, the transducers are not aligned correctly with the record track and, therefore, may pick up noise from the guard bands separating successive record tracks or crosstalk from adjacent tracks. Although this problem is associated with all of the non-normal reproducing modes, as aforesaid, it can be best appreciated by considering the "stop-motion" mode.

Figure 2A:
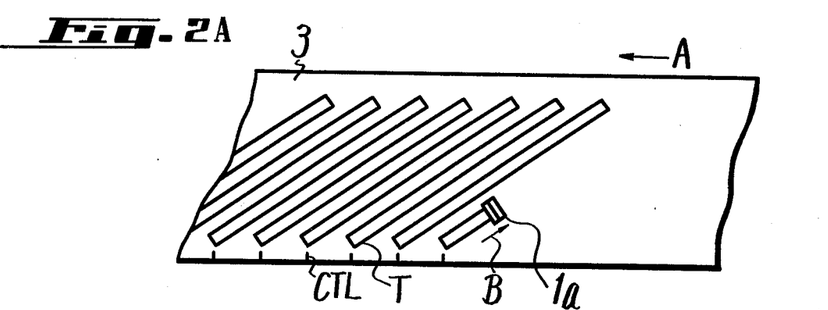
FIGS. 2A, 2B and 2C collectively are plan views of a tape record medium diagrammatically illustrating the parallel skewed record tracks produced by the assembly shown in FIGS. 1A and 1B and an example of the resulting mis-tracking of the rotary transducer due to a variation in the speed of the tape record medium.

Turning to FIG. 2A, there is shown the plurality of parallel tracks T which are recorded on tape 3 during a recording operation. Since tape 3 is advanced in the direction indicated by arrow A, and since the scanning heads, such as head 1a, scan across the surface of tape 3 in the direction indicated by arrow B, parallel tracks T are formed which are skewed relative to the longitudinal axis of the tape. During the normal reproducing operation, tape 3 once again is moved in the direction of arrow A at the same speed as during the recording operation. Also, transducers 1a, 1b are moved in the direction B, at the same speed as during the recording mode. Hence, the scanning path of, for example, transducer 1a during the normal reproducing mode is the same as the scanning path of that transducer during the recording mode. Consequently, the scanning path of transducer 1a coincides with track T, whereby the previously recorded video signals are reproduced accurately.

Figure 2B:
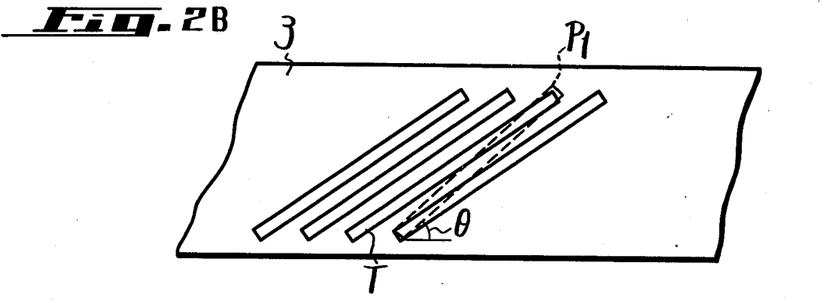
Figure 2C:
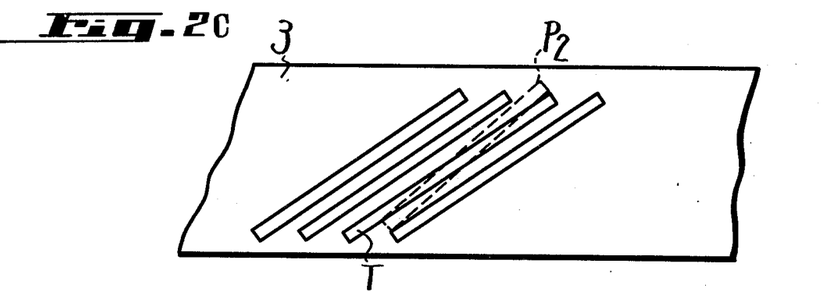

Let it now be assumed that in the "stop-motion" reproducing mode, tape 3 is stopped such that transducer 1a first contacts the tape at a location coincident with the beginning of a recorded track, as shown in FIG. 2B. Since tape 3 is stopped, the scanning path traversed by transducer 1a no longer coincides with the parallel tracks, as shown. Accordingly, in the assumption represented in FIG. 2B, the scanning path $P_1$ is inclined, or angularly disposed with respect to the record tracks T such that only the beginning and terminal portions of the scanning path $P_1$ coincide with the beginning and terminal portions of the adjacent recorded tracks T. If tape 3 is stopped such that the central portion of the scanning path, shown as $P_2$ in FIG. 2C, coincides with the central portion of a recorded track T, the deviation between the scanning path and recorded track is as represented in that figure. Although transducers 1a, 1b traverse the respective scanning paths $P_1$ and $P_2$ depending upon the particular position at which tape 3 is stopped, as shown in FIGS. 2B and 2C, respectively, the signals reproduced by the transducers may not be accurate reproductions of the recorded signals because of the illustrated deviations between the scanning path and the recorded tracks. Thus when one of the transducers deviates to one or the other side of the recorded track which is to be scanned, noise or cross-talk signals from the guard band or an adjacent track are picked up and distort the reproduced signals. The purpose of the present invention is to minimize these deviations automatically. By mounting transducers 1a and 1b on adjustable support members, the position of each transducer relative to a recorded track T can be changed while the transducer scans the tape such that the scanning path thereof coincides with the recorded track.

In a preferred embodiment, each adjustable head support assembly is formed of a piezoelectric member which is responsive to a drive voltage applied thereto so as to bend or deflect in a direction perpendicular to the longitudinal axis thereof. An example of a head support assembly constructed of piezoelectric members is described in U.S. Pat. No. 3,787,616.

Figure 3A:
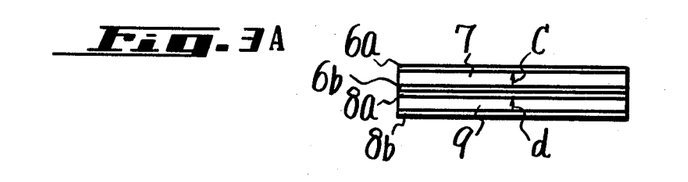
FIGS. 3A, 3B and 3C are schematic diagrams which collectively illustrate the basic structure and principles of operation of the electro-mechanical adjustable transducer support used in the preferred embodiment of the present invention.
Figure 3B:
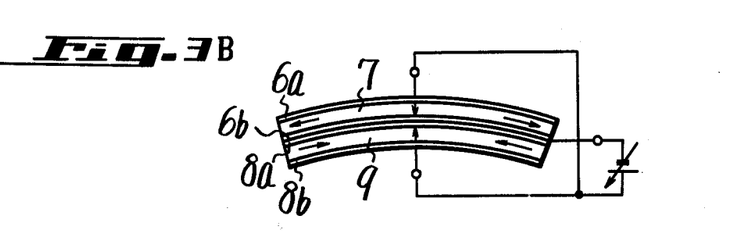
Figure 3C:
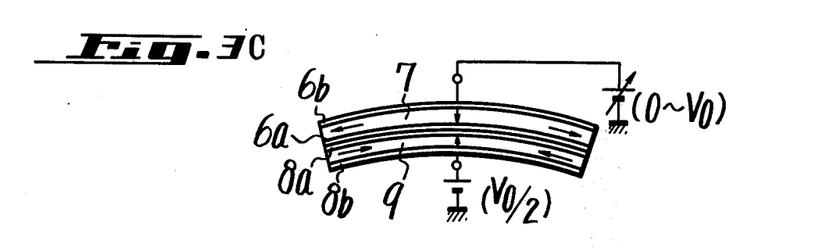

A head support assembly which can be used with the present invention is shown schematically in FIGS. 3A–3C. This assembly is formed of a pair of leaf members 7 and 9, each being constructed of piezo-ceramic material in which the directions of polarization thereof are represented by arrows c and d, respectively. The opposite surfaces of piezo-ceramic leaf member 7 are plated with electrodes 6a and 6b, respectively; and the opposite surfaces of piezo-ceramic member 9 likewise are plated with electrodes 8a and 8b, respectively. If piezo-ceramic members 7 and 9 overlie each other such that electrodes 6b and 8a are in contact, and if a variable drive voltage is applied across the respective members, as shown in FIG. 3B, then piezo-ceramic member 7 tends to expand in its lengthwise direction while piezo-ceramic member 9 tends to compress. As a result of these oppositely-acting forces, the head support assembly bends, or deflects, by an amount which is a function of the strength of the electric field applied across each member. If the polarity of the electric field is reversed, the direction in which the assembly bends, or deflects, correspondingly is reversed.

If the direction of polarization of the piezo-ceramic members is made opposite to each other, that is, if electrode 6a of member 7 now contacts electrode 8a of member 9, the manner in which voltage is applied to the assembly to effect a displacement thereof is as shown in FIG. 3C. Hence, a voltage need not be applied to the electrodes in common contact with each other. Instead, a bias voltage is applied to electrode 8b and if a variable voltage is applied to electrode 6b, the illustrated assembly will bend in a downward direction if the variable drive voltage is less than the bias voltage, and will bend in an upward direction if the variable drive voltage exceeds the bias voltage. For convenience, it is assumed that the bias voltage has a magnitude $V_o/2$ while the drive voltage is variable between O and $V_o$.

Figure 4A:
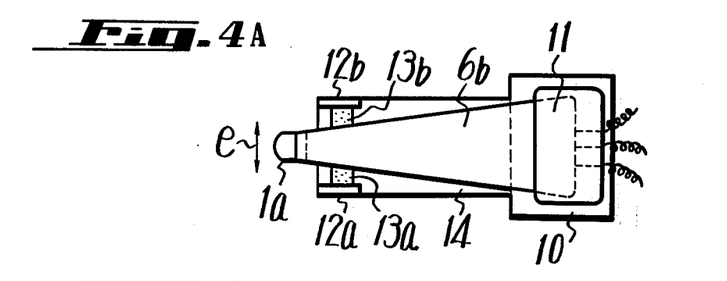
FIGS. 4A and 4B are top and side schematic views, respectively, showing the structure of the electromechanical adjustable transducer support.
Figure 4B:
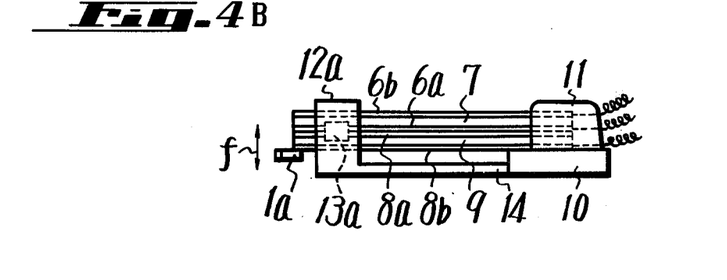

A practical embodiment of a transducer support assembly formed of the leaf members in FIGS. 3A–3C is illustrated in FIGS. 4A and 4B, which are top and side views, respectively. A mounting base 10 receives the piezo-ceramic members which may be secured thereto by a suitable adhesive or plastic molding 11. The leaf members extend outwardly from base 10, and magnetic transducer 1a (or 1b) is mounted on the free end thereof. Mounting base 10 may be secured to the rotary arms of the rotating head assembly or, alternatively, may be secured to the bottom surface of guide drum 2a (FIG. 1B). In either event, the leaf members extend in a direction outward from the rotary axis of the heads.

Preferably, damping or resilient members 13a and 13b such as butyl gum, soft plastic or the like are provided to prevent damp free or resonant oscillation of the leaf members which may be caused by the forces exerted in response to the bending voltages applied to the respective electrodes. For example, these forces may bend the leaf members from a starting position to an ending position as the head mounted thereon traverses its scanning path, and then return the leaf members to their starting position in preparation for another scan. The damping members are intended to damp such oscillation of the leaf members caused by this bending. Accordingly, damping members 13a and 13b are attached to tabs 12a and 12b, respectively, these tabs extending from damping member mounting plate 14 which, as shown, extends outwardly from mounting base 10. Desirable damping action is achieved when damping members 13a and 13b are pressed between the sides of the leaf members and tabs 12a and 12b with suitable force to prevent oscillation in the direction as shown by arrow e but not to prevent deflection of the leaf members in the direction as shown by arrow f in response to the voltage applied thereto. As also shown, contacting leads are secured to the respective electrodes of the leaf members for receiving the deflecting voltage. If necessary, a stopper means (not shown) may be inserted in-between the leaf members and the mounting plate 14 in order to damp or limit any excess deflection due to a high voltage applied across the electrodes. It should be noted that the shape of the leaf members 7 and 9 as shown in FIG. 4A is not rectangular but is instead triangular, magnetic transducer 1a (or 1b) being attached at the apex. By selecting such a shape, the fundamental resonant frequency of the piezoelectric material can be chosen to be suitably high.

During the recording operation, transducers 1a and 1b remain in a normal, undeflected position. Hence, while recording, a deflecting or drive voltage is not applied to the pair of leaf members. However, during a non-normal reproducing mode, it is preferred that a drive voltage be applied. For example, if the scanning path relative to a record track corresponds to scanning path $P_1$ (FIG. 2B), the drive voltage should increase from a zero level at the start of the scanning path to maximum level at the end of the scanning path. If the scanning path relative to a record track corresponds to scanning path $P_2$ (FIG. 2C), then the drive voltage should increase from a minimum level at the start of the scanning path to a zero level at the mid-point thereof and then increase to a maximum level at the end of the scanning path. A suitable drive voltage for deflecting the head support assembly to correct the scanning path deviations shown in FIGS. 2B-2C may have a ramp or sawtooth waveform. For the particular deviation and for the piezo-ceramic leaf assembly shown in FIG. 3C, a ramp waveform applied as the variable drive voltage V should have a mid-point amplitude equal to the bias voltage ($V_o/2$).

Figure 5:
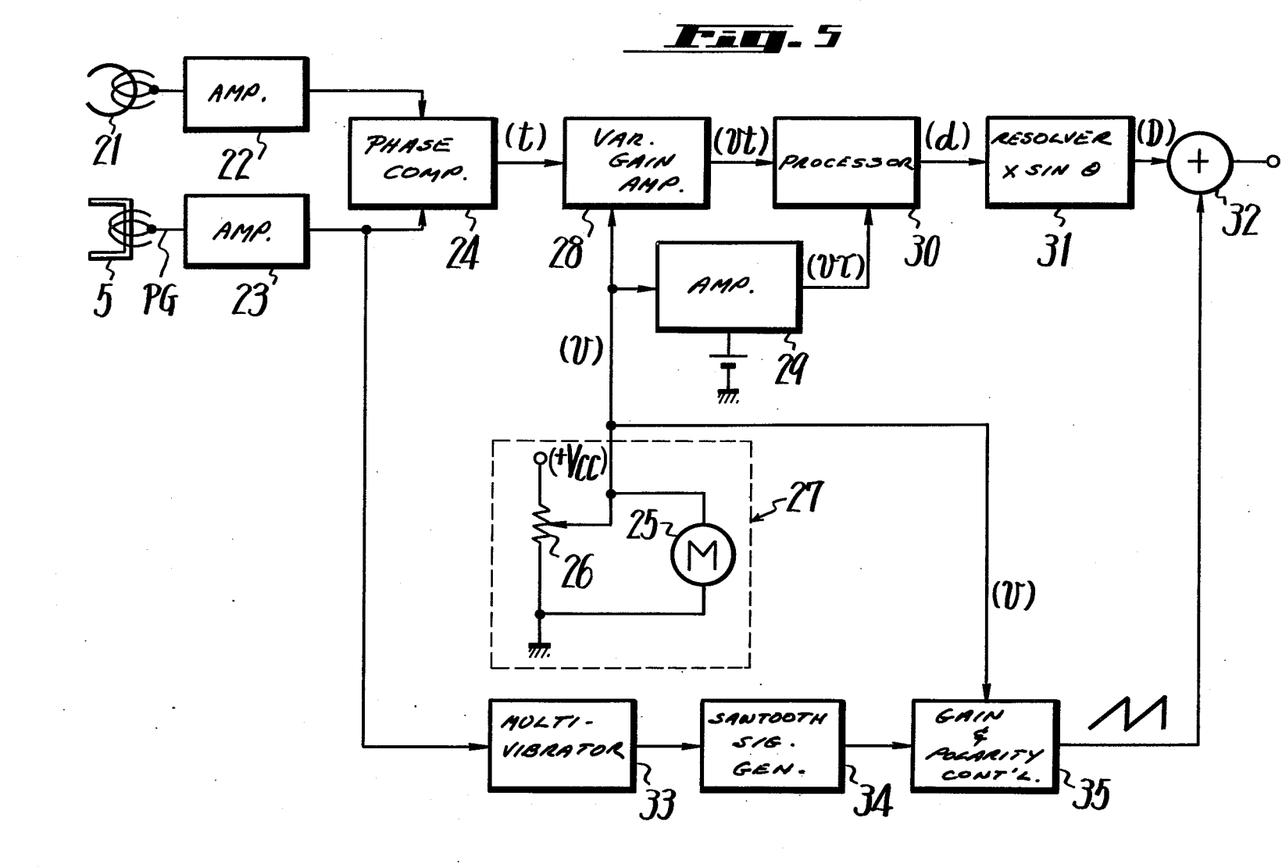
FIG. 5 is a block diagram of the open loop servo control circuit according to the invention.
Figure 6:
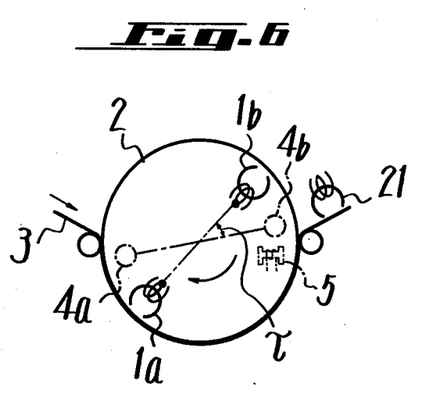
FIG. 6 is a top view similar to FIG. 1A illustrating the positions of the magnetic head for detecting recorded control pulses and the pick-up for detecting the relative position of the rotary transducer.
Figure 7A:
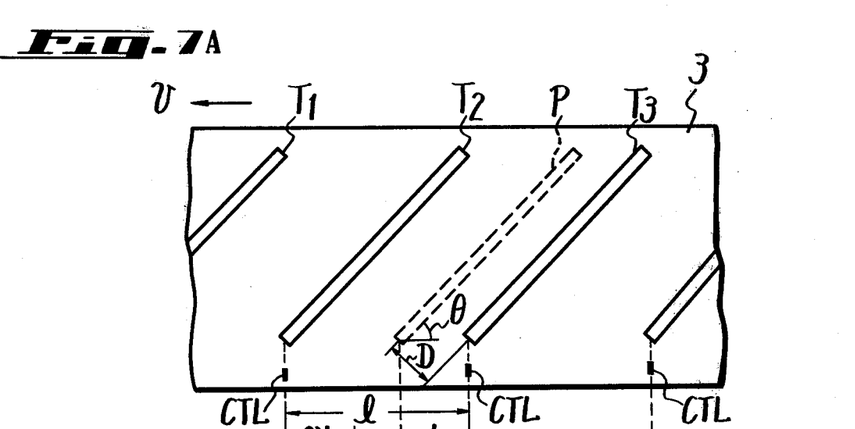
FIG. 7A is a plan view of a tape record medium diagramatically illustrating the geometric and dimensional relations between the parallel skewed record tracks, a displaced scanning path of a rotary transducer and recorded control pulses.

Apparatus for generating a suitable drive voltage for application to the piezo-ceramic leaf assembly for correcting deviations in the scanning path relative to a recorded track during the reproducing mode, is shown in FIG. 5. In this apparatus, magnetic head 21 is a separate, fixed head for the control track of the tape 3 by which the beginning of the recorded tracks can be detected, and pick-up head 5 is the pulse generator by which an accurate position of the rotary transducers 1a and 1b can be detected. The head 21 is disposed at the outside of the tape drum 2, as shown in FIG. 6, to detect the recorded control pulses CTL as represented in FIG. 7A. On the other hand, the pick-up head 5 is disposed in such a manner that magnetic element 4b (or 4a) passes the location of the pick-up head 5 to cause a position detecting pulse PG identifying the position of the rotation to be generated. The rotary transducer 1b (or 1a) starts scanning tape 3 at a time after the position detecting pulse PG is generated, this time being a function of longitudinal tape speed and the fixed phase angle $\tau$ between the magnetic element 4b (or 4a) and the rotary transducer 1b (or 1a). When the initial points of the scanning track $P_1$ and a recorded track T are coincident with each other (FIG. 2B), a control pulse signal CTL will be reproduced through head 21 at a time coincident with the beginning of scann of one of the rotary transducers. On the other hand, when the initial points of the scanning track $P_2$ and a recorded track T are not coincident with each other (FIG. 2C), a control pulse signal CTL will be reproduced at a time before the beginning of scan of one of the rotary transducers.

Figure 7B:
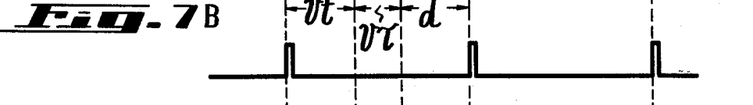
FIGS. 7B, 7C and 7D are pulse diagrams related to the plan view of FIG. 7A.
Figures 7C, 7D:
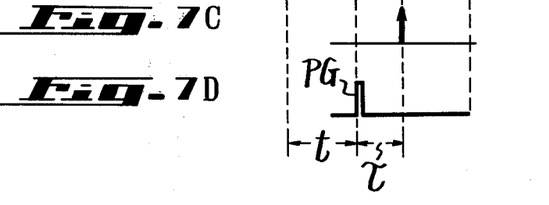

In FIG. 7B, control track pulses from the head 21 are shown where the relationship or timing between the starting point of each recorded track T and the recorded control pulse CTL is predetermined. As shown in FIG. 7A, if there is an initial mis-tracking or tracking deviation, shown by the dotted line P, this deviation can be detected by a pulse PG which indicates the rotary transducer position, as shown in FIG. 7D. According to the embodiment shown, the pulse PG is advanced by the time $\tau$ of the timing shown in FIG. 7C, which corresponds to the starting position of the mis-track P.

Thus, through amplifiers 22 and 23, a reproduced control pulse signal CTL (FIG. 7B) and a pulse PG detecting the position of the rotary transducer are respectively supplied to a phase comparator 24 where the phase difference t (FIG. 7D) is detected. This phase difference t can then be used to develop a signal proportional to a distance component of the initial tracking deviation. This distance component is a function of the relative speed $v$ between the transducer and the tape, or $v \cdot t$. The relative speed $v$, however, is the sum of the tangential speed of the transducer and the tape speed. Since the tangential speed of the transducer is constant, this can be represented by a fixed bias voltage. The tape speed, however, is variable depending on the mode of operation. A voltage proportional to tape speed may be produced by the simplified circuit 27 shown in FIG. 5. In this circuit, the tape speed is controlled by a DC motor 25. The speed of the DC motor 25 is in turn controlled by a potentiometer 26 controlling the voltage supplied to the motor 25.

The output of the phase comparator 24 corresponding to the phase difference t and a voltage from the wiper arm of the potentiometer 26 corresponding to the speed of motor 25 are respectively supplied to a variable gain amplifier 28 where an output corresponding to $v \cdot t$ is obtained, it being understood that a fixed bias voltage corresponding to the tangential speed of the transducer is also applied to the variable gain amplifier 28. Amplifier 28 thus performs the function of a multiplier to produce a signal which is proportional to the product of the relative speed $v$ between the transducer and the tape and the phase difference or time t.

The output of the amplifier 28 is supplied to processor 30 together with the output of amplifier 29. The amplifier 29 is similar to variable gain amplifier 28 and generates an output corresponding to $v \cdot \tau$ where the phase difference $\tau$ is a constant value as defined hereinbefore. Thus, both the phase difference $\tau$ and the tangential speed of the transducer may be represented as fixed bias voltages, and for the sake of simplificaton, these bias voltages may be combined as a single bias voltage for amplifier 29. The output of amplifier 29 corresponding to $v \cdot \tau$ is proportional to another distance component of the initial tracking deviation.

At processor 30, the computation $l - v \cdot t - v \cdot \tau = d$ is carried out, where l is the distance between recorded tracks, that is, the pitch and is a constant value, and d is the initial tracking deviation. The processor 30 may be composed of sum and difference networks. More specifically, the outputs of amplifiers 28 and 29 are first summed and the resulting output is then subtracted from a fixed voltage representing the distance l.

In order to compensate for the initial track error or deviation d, an initial deviation for transducer 1a or 1b should be given via the piezoelectric members so that the beginning point of the scanning track P will be coincident with that of the recorded track T. The direction of head deviation due to flexure of the piezoelectric members will be roughly at right angles with respect to the track direction. Therefore, it is necessary to compute $D = d \sin\theta$, where D is the right angle resolved tracking error and $\theta$ is the skew angle of the track P. This is accomplished by means of a resolver 31 which is connected to the output of processor 30. Resolvers which produce outputs proportional to the sine or cosine of a resolving angle multiplied times an input variable are well known in the art. However, since the angle $\theta$ and hence $\sin\theta$ are predetermined fixed constants, the resolver 31 can be simply implemented by means of an attenuator which multiplies the output of processor 30 by a value proportional to $\sin\theta$. The output of resolver 31 is supplied as one input to adder 32.

On the other hand, the pulse PG from amplifier 23 is also supplied to multivibrator 33 to shift the pulse timing corresponding to the fixed phase angle $\tau$. Thus, the shifted pulse corresponding to the beginning point of the scanning track P will trigger sawtooth waveform signal generator 34, from which a fixed period sawtooth waveform signal is obtained. The period of the sawtooth waveform signal is substantially equal to the time required for the transducer to traverse its scanning path. The output of sawtooth waveform signal generator 34 is supplied to a gain and polarity control circuit 35 where the sawtooth waveform signal will be controlled or limited in accordance with the voltage derived from circuit 27, this voltage being proportional to tape speed. With a decreased tape speed relative to the normal speed, the angle $\theta$ of the scanning track P will be increased with respect to the recorded tracks, whereas an increased tape speed relative to the normal speed will result in a decrease in the angle $\theta$ with respect to the recorded tracks. To adjust the angle $\theta$ or to scan the recorded track precisely, a slope-controlled sawtooth waveform signal is required during scanning. The circuit 35 provides this control by controlling the maximum amplitude and polarity of the sawtooth waveform signal. More specifically, if the output voltage from circuit 27 corresponds to normal tape speed, the output signal from circuit 35 is reduced to zero. On the other hand, if the output voltage from circuit 27 corresponds to a non-normal tape speed as is required for "stop-motion", "slow-motion" or "fast-motion" modes of operation, the output sawtooth waveform signal will have a maximum amplitude determined by the difference in tape speed from normal speed and a polarity determined by whether the tape speed is greater than or less than the normal speed. The output of circuit 35 is supplied to the second input of adder 32 which produces at its output the composite drive signal for the electro-mechanical adjustable transducer support.

By means of the circuit shown in FIG. 5, identification of the beginning point for scanning, and adjusting for mis-tracking during the scanning, due to variable tape speeds are both accomplished. The output of the adder 32 is applied to the electro-mechanical transducers 7 and 9 through a driving circuit (not shown).

The tracking-error correcting system according to this invention has been described for particular use in correcting tracking errors which occur during the non-normal reproducing modes. Thus, even though the record medium moves at a relatively slower rate during the "slow-motion" reproducing mode and at a relatively faster rate during the "fast-motion" reproducing mode, tracking errors which arise during these reproducing modes can be corrected by this invention. Essentially, during the "slow-motion" or "fast-motion" modes, the drive signal produced by the circuitry shown in FIG. 5, for the purpose of adjusting the beginning point for scanning and the scanning path traversed by the head so as to precisely track the recorded track, is not a constant level. Rather, this drive signal is changed and controlled periodically as a function of the speed of the record medium. According to this invention, mis-tracking can be automatically compensated not only in the case of the normal reproducing mode but also in the cases of the various non-normal reproducing modes. In addition, a desired speed mode of operation can be carried out without any deterioration of reproduced signal quality. The means used to accomplish this is an open loop servo system which is both simple and accurate. Finally, it is not necessary to detect or use the envelope of the output signal from the rotary transducer itself in a closed loop servo system to accomplish the automatic tracking. This is of practical importance because it means that a conventional video integrated circuit (IC) can be used without modification. Having described a specific embodiment of the invention with reference to the accompanying drawings, it is to be understood that the invention is not limited to that precise embodiment, and that varous changes and modifications may be effected therein by one skilled in the art without departing from the scope or spirit of the invention as defined in the appended claims.

What is claimed is:

1. In an apparatus of the type wherein signal information is recorded in a plurality of parallel tracks on a record medium, said parallel tracks being disposed at a skew angle with respect to the direction of travel of said record medium, said apparatus having a rotary transducer for scanning said parallel tracks and an electromecnanical adjustable transducer support provided to support said transducer in scanning relation to said record medium, said transducer support being operative to displace said transducer transversely with respect to said parallel tracks in response to a drive signal, the improvement comprising an open loop servo system for generating said drive signal to align the scanning path of said transducer with one of said parallel tracks, said open loop servo system comprising first detecting means for detecting the position of the beginning of one of said parallel tracks in the direction of travel of said record medium and providing a first output, second detecting means for detecting the rotational position of said rotary transducer and providing a second output, speed signal generating means for generating an output signal corresponding to the speed of said record medium, and signal processing means receiving as inputs the outputs of said first and second detecting means and said speed signal generating means for generating said drive signal.

2. The apparatus of claim 1, said signal processing means including phase detecting means for producing an output error signal corresponding to a phase difference between the outputs of said fitst and second detecting means and multiplying means connected to receive the outputs of said phase detecting means and said speed signal generating means.

3. The apparatus of claim 2, said multiplying means comprising a first multiplier connected to receive as inputs the outputs of said phase detecting means and said speed signal generating means for producing a first distance signal proportional to the product of said output error signal and the speed of said record medium, a difference circuit connected to receive the output of said first multiplier and providing a track error deviation signal proportional to the difference between the distance between adjacent ones of said parallel tracks, along the direction of travel of said record medium, and said first distance signal, and an angle resolving circuit connected to receive the output of said difference circuit to produce a signal proportional to the product of said track error deviation signal and the sine of the skew angle of said parallel tracks.

4. The apparatus of claim 3, wherein said second detecting means produces an output at a predetermined fixed phase in advance of the scanning track of said rotary transducer, said multiplying means further includes a second multiplier connected to receive, as inputs, the output of said speed signal generating means and a fixed bias corresponding to said predetermined fixed phase for producing a second distance signal proportional to said fixed bias and the speed of said record medium, the output of said second mulitplier is connected to an input of said difference circuit and said track error deviation signal is proportional to the difference of said distance between adjacent ones of said parallel tracks and the sum of said first and second distance signals.

5. The apparatus of claim 1, wherein said open loop servo system further comprises sawtooth waveform generating means responsive to the output from said second detecting means for producing an output sawtooth waveform signal having a fixed period which is substantially equal to the time required for said rotary transducer to traverse its scanning path on said record medium, amplitude adjusting means connected to receive the outputs of said sawtooth waveform generating means and said speed signal generating means for changing the slope of said sawtooth waveform signal as a function of the speed of said record medium, and adding means for adding the outputs of said signal processing means and said amplitude adjusting means for generating said drive signal.

6. The apparatus of claim 5, wherein said second detecting means produces an output at a predetermined fixed phase in advance of the scanning track of said rotary transducer, and further comprising delay pulse generating means connected between said second detecting means and said sawtooth waveform generating means and being responsive to the output from said second detecting means for producing trigger pulses for said sawtooth waveform generating means, said trigger pulses being delayed by a time period corresponding to said predetermined fixed phase.

7. In an apparatus of the type wherein signal information is recorded in a plurality of parallel tracks on a record medium, said parallel tracks being skewed with respect to the direction of travel of said record medium, said apparatus having a rotary transducer for scanning said parallel tracks and an electro-mechanical adjustable transducer support provided to support said transducer in scanning relation to said record medium, said transducer support being operative to displace said transducer transversely with respect to said parallel tracks in response to a drive signal, the improvement comprising an open loop servo system for generating said drive signal to align the scanning path of said transducer with one of said parallel tracks, said open loop servo system comprising detecting means for detecting the rotational position of said rotary transducer, speed signal generating means for generating an output signal corresponding to the speed of said record medium, sawtooth waveform generating means responsive to said detecting means for producing a sawtooth waveform signal having a fixed period which is substantially equal to the time required for said rotary transducer to traverse its scanning path on said record medium, and amplitude adjusting means connected to receive the outputs of said sawtooth waveform generating means and said speed signal generating means for changing the slope of said sawtooth waveform signal as a function of the speed of said record medium.

* * * * *